United States Patent [19]

Walworth et al.

[11] 3,882,142

[45] May 6, 1975

[54] 1,2-DIALKYL-3,5-DIPHENYL PYRAZOLIUM SALTS

[75] Inventors: Bryant Leonidas Walworth, Pennington; Erwin Klingsberg, Mountain Side, both of N.J.

[73] Assignee: American Cyanamid Company, Stamford, Conn.

[22] Filed: Nov. 17, 1972

[21] Appl. No.: 307,672

Related U.S. Application Data

[63] Continuation-in-part of Ser. No. 271,424, July 13, 1972, abandoned, which is a continuation-in-part of Ser. No. 209,448, Dec. 17, 1971, abandoned.

[52] U.S. Cl.................. 260/311; 71/92; 260/310 R; 260/590
[51] Int. Cl............................................. C07 49/18
[58] Field of Search........................ 260/310 R, 311

[56] References Cited
OTHER PUBLICATIONS

Elguero et al., Bull. Soc. Chim. France, 1969(5), pages 1687–98, QD1.S4.

Timofeeva et al., J. Gen. Chem. USSR, Vol. 40, pages 2057–62, (1970), QD1.Z6a.

Huisgen et al., Chem. Berichte, Vol. 101, pages 536–39 & 546, relied on (1968), QD1.D4.

Klingsberg, Chem. Abst., Vol. 58, columns 7920–21 (1963), QD1.A51.

Theilacker et al., Chem. Abst., Vol. 46, columns 477–9 (1952), QD1.A51.

*Primary Examiner*—Natalie Trousof
*Attorney, Agent, or Firm*—Robert P. Raymond

[57] ABSTRACT

This invention relates to the use of certain 1,2-dialkyl-3,5-diphenyl pyrazolium salts as herbicides. It also relates to herbicidal formulations of such salts. It further relates to certain novel pyrazolium salts. Finally, it relates to methods for the preparation and use of herbicidal formulations and novel salts.

7 Claims, No Drawings

1,2-DIALKYL-3,5-DIPHENYL PYRAZOLIUM SALTS

This application is a continuation-in-part of application Ser. No. 271,424, filed July 13, 1972 which in turn is a continuation-in-part of application Ser. No. 209,448, filed Dec. 17,1971 both now abandoned.

This invention relates to the use of certain 1,2-dialkyl-3,5-diphenylpyrazolium salts as herbicides. It also relates to herbicidal formulations of such salts. It further relates to certain novel pyrazolium salts. Finally, it relates to methods for the preparation and use of herbicidal formulations and novel salts.

More particularly, the herbicidal methods of the present invention relate to the control of undesirable plant species by applying to their foliage a herbicidally effective amount of a compound having the following formula:

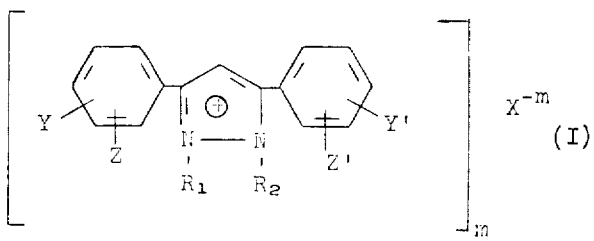

(I)

wherein $R_1$ and $R_2$ each represent lower alkyl groups having 1 to 4 carbon atoms; Y, Y', Z and Z' each independently represent a member selected from the group consisting of hydrogen, halogen, nitro, alkyl $C_1$–$C_4$, haloalkyl $C_1$–$C_4$, and alkoxy $C_1$–$C_4$; X represents an anion with a charge of from 1 to 3; and $m$ is an integer selected from 1, 2 and 3.

Suitable halogen substituents include, for example, fluoro, chloro, bromo and iodo. The chloro, bromo and fluoro are preferred.

Suitable alkyl substituents include methyl, ethyl, n-propyl, iso-propyl, n-butyl, iso-butyl and tert-butyl.

Suitable alkoxy substituents include methoxy, ethoxy, n-propoxy, iso-propoxy, n-butoxy, iso-butoxy and tert-butoxy.

Suitable haloalkyl substituents are alkyl substituents, such as the above having substituted thereon one or more chloro, bromo or fluoro groups or mixtures thereof.

As will be apparent from the description and examples below, salts of the pyrazolium structure depicted in formula (I) above have unexpected herbicidal activity, irrespective of the anion employed in association therewith.

Illustrative of the anions which are suitable for use in the present invention may be mentioned, for example, halides, such as chloride, bromide or iodide; acetate; sulfate, hydroxide; hydrogen sulfate; methyl sulfate; benzene sulfonate; $C_1$–$C_4$ alkoxy benzene sulfonate; $C_1$–$C_3$ alkyl benzene sulfonate, preferably a toluene sulfonate, such as, p-toluene sulfonate; nitrate; phosphate; carbonate; hydrogen carbonate; alkane sulfonate $C_1$–$C_4$; perchlorate; $Br_3^-$ and $I_3^-$.

With regard to the pyrazolium salts of formula (I), it is to be understood that certain multivalent anions such as sulfate, phosphate, and the like may have associated with them a cation in addition to the pyrazolium cation, as for example a proton or an alkali metal or alkaline earth metal.

For simplicity, such anions are portrayed as being unionized although they probably are in fact further ionized. Typical representations are: $NaSO_4^-$, $KPO_4^-$, $MgPO_4^-$, $HSO_4^-$, $NaHPO_4^-$, and the like.

The plants which can be effectively controlled by application of one or more of the formula (I) pyrazolium salts include both broad leaf plants and annual grasses (monocotyledonous and dicotyledonous plants).

Generally preferred compounds for this use are those wherein the compound has the structure wherein Y, Y', Z and Z' are hydrogen; $R_1$ and $R_2$ are methyl; $m$ is 1 and X is selected from the group consisting of chloride, bromide, iodide, acetate, hydroxide, hydrogen sulfate, methyl sulfate, p-toluene sulfonate, perchlorate and alkyl sulfonate $C_1$–$C_4$.

Especially preferred salts for this general use include 1,2-dimethyl-3,5-diphenylpyrazolium p-toluenesulfonate, 1,2-dimethyl-3,5-diphenylpyrazolium methyl sulfate, 1,2-dimethyl-3-(m-chlorophenyl)-5-phenylpyrazolium methyl sulfate, 1,2-dimethyl-3-(m-methylphenyl)-5-phenylpyrazolium methyl sulfate, 1,2-dimethyl-3-(o-methylphenyl)-5-phenylpyrazolium methyl sulfate and 1,2-dimethyl-3-(p-chlorophenyl)-5-phenylpyrazolium methyl sulfate.

This invention also relates to a method for the control of wild oats (*Avena* species) by application of a herbicidally effective amount of one or more of the formula (I) pyrazolium salts to the foliage thereof. Those wherein $R_1$ is methyl; $R_2$ is alkyl $C_1$–$C_4$; Y, Y', Z and Z' each independently represent a member selected from the group consisting of hydrogen, halogen, methyl and methoxy; provided that only one of the phenyl rings is substituted para to the pyrazolium ring with a substituent other than hydrogen are preferred. They effectively control the wild oats at unexpectedly low levels of application, such as at from 0.5 to 3.0 pounds per acre.

It is also a significant aspect of the present invention that such compounds permit the selective control of wild oats, e.g. *Avena fatua*, *A. ludoviciana* and *A. sterilis* growing in cereal grains, such as in wheat, barley and rye, and other crops which grow in wild oat infested areas, such as sugarbeets, rape, flax, sunflower, peas and potatoes.

Wild oats infestation in such crops as wheat and barley can drastically reduce crop yield by competition for sunlight, water and nutrients as well as cause crop contamination.

Few herbicides selectively control wild oats in crops such as wheat and barley. Those that are so employed generally present one or more disadvantages. For example, some are preemergence herbicides and thus require application before a determination can be made that an infestation exists. Others are only effective for the short period of time when the past has one or two leaves. If spraying is delayed, such herbicides become uneffective. Others are only optimally employed with adult plants after tillering has occurred. In such cases the pest has already deprived the crop of nutrients, water and sunlight. Others, while highly selective on wheat, have only marginal selectivity on barley.

The advantages of the present invention lie in the good postemergence selectivity on wheat as well as being highly selective on barley, combined with herbicidal effectiveness throughout the early and middle life of the wild oat plant, together with their favorable dertoxicity which is greater than 5,000 mg./kg. in rabfor 1,2-dimethyl-3,5-diphenylpyrazolium methyl ite, low eye irritation and acute oral toxicities /50) of about 580 mg./kg. and 50 mg/kg. in male and female mice, respectively, for said compound. e pyrazolium salts are conveniently prepared by condensing the appropriate diketone with hydraor a $C_1$–$C_4$ lower alkyl hydrazine to form the correiding 3,5-diphenylpyrazole. Thereafter, said pyre is alkylated to form the desired formula (I) zolium salt.

here hydrazine is employed in the condensation, lations are effected at the 1 and 2 positions. Where wer alkyl hydrazine is employed in the initial consation, alkylation is effected at the 2 position. These tions are graphically depicted as follows:

kali metal hydroxide or alkoxide, or a tertiary organic amine. Suitable bases include, for example, sodium methoxide, sodium hydroxide, triethylamine and the like.

The alkylation reactions are preferably conducted in the presence of a solvent, such as toluene, methylisobutyl ketone, n- or iso-propanol or an aqueous alcohol solution, such as a mixture of n-propanol and water.

Suitable alkylation reagents include, for example, alkyl halides, alkyl acetates, alkyl sulfates, alkyl nitrates, alkyl phosphates, alkyl carbonates, alkyl perchlorates, alkyl hydrogen sulfates, alkyl methyl sulfates and alkyl toluene sulfonates; wherein, said alkyl groups are in the range of from $C_1$–$C_4$ to provide the appropriate alkyl substituent in the formula (I) compound.

Anion exchange can be used to associate the desired

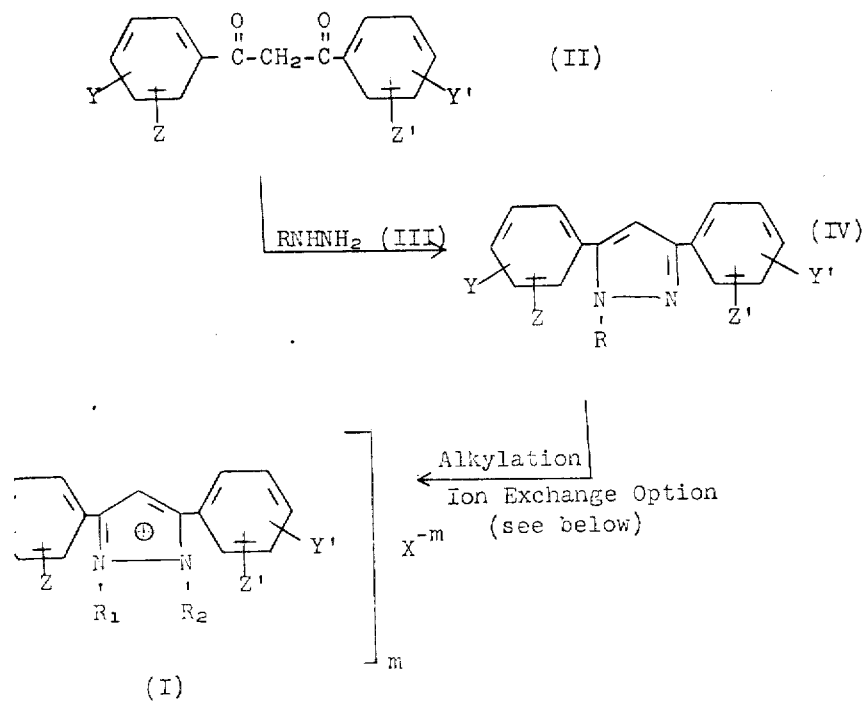

rein $m$, $R_1$, $R_2$, Y, Y', Z, Z' and X are as described ormula (I) above; and R is hydrogen or lower alkyl $_1$–$C_4$.

nce the diketone and hydrazine compounds comin equimolar quantities, it is preferable to maintain molar ratio of reactants at about 1:1; however, a it excess (up to about 10 percent) of either reactant be used.

e ring-forming reaction between the hydrazine or l hydrazine and the diketone is preferably carried by combining the reactants in a solvent and heating e reaction temperature. Suitable temperatures are e range of from about 70° to about 150°C. and, erably, between 80°and 120°C. Suitable solvents ide, for example, aprotic solvents, such as, xylene, ene, benzene, pyridine, DMSO, DMS, and the like, rotic solvents, such as, $C_1$–$C_4$ alcohols, preferably, nd iso-propanol. Where the latter solvents are emed, high rates of conversion are obtained at temtures in the range of 80° to 85°C.

here hydrazine is employed in the initial condensa- reaction, alkylation of the resulting pyrazole is acplished with conventional alkylating agents, prefer, in the presence of an acid acceptor, such as an alanion or anion mixture with the cation desired, as described below.

The pyrazole and alkylating reagent combine on an equimolar basis. However, it is often preferred to employ an excess of the alkylating agent. Optimum reaction conditions for effecting the alkylations will vary depending on the reactants employed. Reaction is effected by combining the alkylating agent, the pyrazole and, preferably, the acid acceptor and solvent. Reaction often occurs at room temperature. If not, the reaction mixture is heated until the reaction occurs. Where the alkylating reagents employed are volatile, such as methyl chloride, the reaction is preferably conducted in a sealed vessel under pressure, to avoid loss of the reactants.

Quaternization of the 1-alkylpyrazole is effected by reaction thereof with at least an equimolar quantity of an alkylating agent, such as those mentioned above.

This reaction is preferably conducted in the presence of a solvent, such as, a lower alcohol $C_1$–$C_4$; a ketone, such as, acetone, methyl isobutyl ketone, methyl ethyl ketone or cyclohexanone; a chlorinated hydrocarbon, such as, chloroform; an ether, such as diethyl ether, methyl ethyl ether or di-n-propyl ether; an aprotic solvent, such as dimethyl sulfoxide or dimethylformamide; or, preferably, an aprotic solvent, such as xylene, toluene or benzene.

The quaternization is effected by mixing the reactants and solvent at temperatures maintained between 35° and 150°C., preferably between 50° and 125°C.

Since the 1-alkylpyrazole and alkylating reagent combine in equimolar quantities, it is preferred to employ a 1:1 molar ratio thereof; however, a slight excess (up to 10 percent) of either reagent may be employed.

As in the previously discussed alkylation reaction, where the alkylating agent is volatile at the temperatures used, such as in the case of methyl chloride, it is preferred to use a sealed pressure vessel to conduct the reaction.

Where the diketone selected is asymetrically substituted and $R_1$ differs from $R_2$ in the formula (I) compound to be produced, a mixture of isomers will result from the above synthetic scheme. In such cases, it is generally expedient to employ the isomer mixture in the herbicidal processes of the present invention. Where their separation is desired, however, it may be effected by conventional separation techniques, such as, for example, by fractional crystallization.

In carrying out the above ring closure and alkylation reactions, it may be expedient to initially form a salt having an anion other than that which it is desired to employ in the herbicidal processes of the present invention. In such cases, the exchange in anion may be conventionally made in a subsequent step, such as that graphically depicted below:

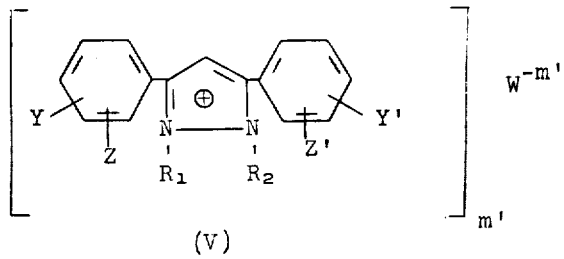

(V)

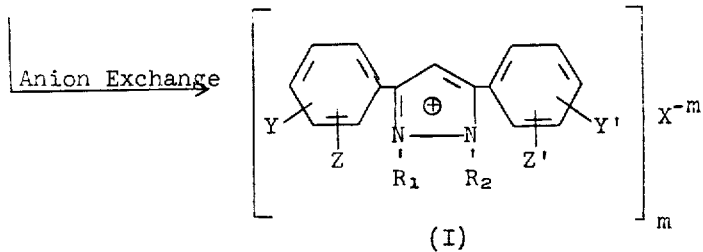

(I)

wherein $m$, $R_1$, $R_2$, Y, Y', Z and Z' are as defined for formula (I) above; $m'$ is an integer selected from 1, 2 and 3; and W is an anion.

The exchange may be effected by treating the initially formed salt with an ion exchange resin. Among the suitable ion exchange resins, one may mention a strong base organic anion exchanger. Illustrative exchangers employ quaternary ammonium salts. Where the resin is supplied as the salt of an anion other than that desired, it is pretreated with an aqueous solution of a salt of the desired anion. For example, if the resin is supplied as a quaternary ammonium chloride and it is desired to produce a pyrazolium nitrate, one would pretreat the resin with an aqueous solution of sodium nitrate.

Other optional subsequent modifications of the anion in the pyrazolium salt may be effected. For example, a pyrazolium chloride may be conveniently converted to the corresponding bromide or iodide by treatment with NaBr or NaI, respectively, in a solvent, such as acetone. A pyrazolium salt, such as, the chloride may be converted to the corresponding perchlorate by treatment of an aqueous solution of said salt with perchloric acid. This results in the precipitation of the less soluble perchlorate salt. The bromides or iodides may be conveniently converted to the tribromides or triiodides by adding bromine or iodine to a solution of the monobromide or monoiodide in a solvent, such as ethanol.

The novel compounds of the present invention are those having formula (I) provided that $X^{-m}$ is not $I^{-1}$, $ClO_4^{-1}$ or $Cl^{-1}$ when Y, Z, Y' and Z' are hydrogen and $R_1$ and $R_2$ are methyl.

The compound 1,2-dimethyl-3,5-diphenylpyrazolium iodide is disclosed in Bulletin De La Societe Chimique De France No. 5, pages 1687–98 (1969). The correspnding perchlorate is disclosed in Zhurnal Obshchei Khimii, Vol. 40, No. 9, pages 2072–8 (September, 1970), the English version of which appears in the Journal of General Chemistry, U.S.S.R. 40, pages 2057–2062 (1970). While the corresponding chloride does not appear to have been known as a pure composition of matter (that is, as the pure compound per se) it may have been present, although unnamed, in the form of an impure composition employed in the synthesis of the perchlorate mentioned above.

Notwithstanding the above art, there is nothing to suggest the present utility of the formula (I) pyrazolium salts or the advantages of the preferred compounds therein.

As previously noted, the compound 1,2-dimethyl-3,5-diphenylpyrazolium chloride does not appear to have been mentioned in the prior art. However, it may have been present in the reaction mixtures reported in the Russian Journal in combination with various impurities. The impurities of the reaction mixture appear to cause severe foliar burn to such crops as soybeans, cotton and corn in comparison with the use thereon of 1,2- dimethyl-3,5-diphenylpyrazolium chloride per se. Since the chloride component of the reaction mixture had no known utility, no attempt was made to isolate it as the pure compound per se or even establish its existence. One advantage to the hydrazine and alkyl hydrazine process of manufacture described above over the dimethyl hydrazine hydrogen chloride process of the Russian article resides in the formation of the pyrazole intermediate IV which may be purified by conventional purification techniques (distillation, crystallization, etc.) prior to the alkylation reaction, where such purification steps are desired or desirable.

As will be noted below, those pyrazolium salts which demonstrate a high degree of water solubility possess substantial advantages in the preparation of water miscible concentrates. Among the preferred salts in this regard are the methyl sulfates, hydrogen sulfates, sulfates, bromides, tosylates and the chlorides (free of adverse impurities such as those occurring in the method of the Russian reference). Specifically, preferred salts are the 1,2-dimethyl-3,5-diphenylpyrazolium salts of the above anions, which provide about 1.6 to about 2.2 milliequivalents of the pyrazolium cation per gram of aqueous solution at about 18°-23°C. as opposed to salts such as the corresponding perchlorate and iodide, which only provide about 0.002 to 0.03 milliequivalents of the cation per gram of aqueous solution.

1,2-Dimethyl-3,5-diphenylpyrazolium methyl sulfate is especially preferred by reason of its excellent herbicidal activity, as shown, for example, below and due to the relative convenience by which it may be prepared from inexpensive materials. The pyrazolium methyl sulfate is prepared using dimethyl sulfate as the quaternizing agent for the appropraite pyrazole. The dimethyl sulfate is far less expensive and easier to employ than the low boiling methyl chloride and iodide employed in the direct synthesis of the pyrazolium chloride and iodide.

In comparison with the iodide and the perchlorate, the methyl sulfate has the added advantage of providing about 70 and 525 times the milliequivalents of pyrazolium cation respectively.

In applying the formula (I) pyrazolium salts to the foliage of the undesirable plant species, the salts are preferably formulated as post-emergence herbicidal compositions by admixing a herbicidal adjuvant with a herbicidally effective amount of the salt. Suitable adjuvants include one or more conventional solid or liquid carriers, diluents and formulation aids, particularly surfactants. The salts may be formulated alone, in combination with each other or with other pesticidal agents. The water-miscible concentrates discussed below are especially advantageous. The present invention is further directed thereto as well as to methods for their preparation and use.

Application of the salts as dusts, dust concentrates, wettable powders and water-miscible compositions using conventional application equipment at rates of from 0.25 to 20 pounds of active ingredient (i.e. cation) per acre are preferred.

Dusts are generally prepared by grinding together about 1 to 25 percent by weight of the active agent with from about 99 to 75 percent by weight of a solid diluent such as kaolin, attapulgite, talc, pumice, diatomaceous earth, fullers earth, wood flour, or the like. Dust concentrates are prepared in similar fashion excepting that about 25 to 95 percent by weight of the active agent is ground with about 75 to 5 percent by weight of the diluent.

Wettable powders are prepared in the same manner as the dust concentrates excepting that about 1 to 5 percent by weight of a dispersing agent such as the calcium salt of a polymerized alkyl aryl sulfonic acid, sodium lignosulfonate, or sodium salt of condensed naphthalene sulfonic acid is blended with the mixture and about 1 to 5 percent of a surfactant, such as polyoxyethylated vegetable oil, alkyl phenoxy polyoxyethylene ethanol, sodium alkyl naphthalene sulfonate is also blended with the formulation.

The water-miscible concentrates are prepared by dissolving from 15 to 70 percent of the compound in 85 to 30 percent of a water-miscible solvent, such as water itself or another polar water-miscible solvent, such as 2-methoxy ethanol, methanol, propylene glycol, diethylene glycol, diethylene glycol monoethyl ether, formamide, and methylformamide. Application of the material is made by adding a predetermined quantity of the water-miscible concentrate to a spray tank and applying as such or in combination with a suitable diluent, such as after addition of a further quantity of water or one of the above polar solvents.

The performance of the product in all of the above formulations, which are applied as liquid sprays, is unexpectedly improved by adding a surfactant or blend of surfactants. Conventional anionic, cationic and anionic-nonionic surfactants may be employed.

Suitable nonionic surfactants include alkyl polyoxyethylene ethers, polyoxyethylene (20) sorbitan monolaurate, polyoxyethylene (20) sorbitan monooleate, alkylarylpolyglycol ethers, alkyl phenol ethoxylates, trimethyl nonyl polyethylene glycol ethers, alkyl phenol ethylene oxide condensates, octyl phenoxy polyethoxy ethanols, nonylphenyl polyethylene glycol ethers, condensates of polyoxy ethylenes, polyoxy propylenes, aliphatic polyethers, aliphatic polyesters, alkylaryl polyoxyethylene glycols, and the like.

Suitable anionic surfactants include sodium dodecylbenzene sulfonate and the dioctyl ester of sodium sulfosuccinic acid.

Suitable cationic surfactants include dicoco dimethylammonium chloride, stearamidopropyl dimethyl beta-hydroxyethylammonium nitrate and the like.

These surfactants are preferably added to the spray tank at the rate of 0.1 to 5 percent by volume to provide good wetting of the spray solution on plant foliage.

Herbicidal concentrates containing surfactants are preferably formulated as aqueous sprays containing approximately 29 percent by weight of the appropriate salt, from about 26 to 50 percent by weight of water and the remainder of said formulation (26–44 percent weight weight) of a selected surfactant. Surfactants which have been used in preparing suitable surfactants containing concentrates include an octylphenol ethylene oxide condensate, an ethanolic solution of an alkyl phenol ethoxylate, a polyglycolic ether condensate produced from ethylene oxide and an alkyl phenol and an alkyl aryl polyglycolic ether. Typical formulations are (1) 28.6 percent of 1,2-dimethyl-3,5-diphenyl pyrazolium methyl sulfate, 27.0 percent of one of the above surfactants and 49.4 percent water; and (2) 28.6 percent of 1,2-dimethyl-3,5-diphenyl pyrazolium methyl sulfate, 44 percent of one of the above surfactants and 24.7 percent water.

In control of wild oats, preferably about 2 quarts of the concentrate containing surfactant (1) would be admixed with 20 gallons of water and applied as a dilute aqueous spray to cover 1 acre of treated area. This spray solution would contain approximately 0.5 percent by weight of the surfactant. Formulation (2) would preferably be used in a similar manner except that 2 quarts of the formulation would be admixed with 40 gallons of water and applied as the dilute aqueous spray to cover 1 acre of treated area.

It is, of course, obvious that the formulations can be varied to provide dilute aqueous sprays containing from about 0.1 to 5.0 percent by weight of the surfactant and a herbicidally effective amount of the pyrazolium salt.

As previously noted, the water-miscible herbicidal concentrates of the present invention are prepared by dissolving 15 to 70 percent of a pyrazolium salt of formula (I) in 85 to 30 percent of a water-miscible polar solvent. These compositions are unexpectedly improved with regard to herbicidal effectiveness by the further step of adding a surfactant. Nonionic, anionic or nonionic-anionic blends may be employed. Nonionic surfactants are preferred, especially those having a hydrophilic-lipophilic balance (HLB) of from 11 to 16. This conventional surfactant classification test is described, for example, at page 232 et seq of *Emulsion Theory and Practice* by Paul Becher, Rheinholt Publishing Corporation, second edition (1965); also available as No. 162 in the American Chemical Society's Monograph Series.

Preferred methods employ water as the solvent and 1,2-dimethyl-3,5-diphenyl pyrazolium methyl sulfate as the active ingredient.

These compositions are effective for the postemergence control of undesirable plants when applied at a rate sufficient to provide 0.25–20 lbs./acre of active ingredient (i.e. cation. Application at rates of from about 0.5 lb. to 10 lbs. per acre of said active material are more preferred. For selective postemergence control of wild oats, about 0.50 lb. to 3.0 lbs. per acre of active material (i.e. cation) are usually preferred.

The present invention and preparation of the starting materials therefor are further illustrated by the following examples which are not to be taken as being limited thereto. Unless otherwise indicated, all parts and percentages are by weight, in the following illustration and examples as well as in the claims and the discussion above.

Preparation of the dibenzoyl methane starting materials is exemplified by Illustration A below for m-trifluoromethyl dibenzoyl methane.

A variety of suitably substituted dibenzoyl methanes for use in the present invention are commercially available or may be conveniently prepared by a variety of procedures well known in the chemical literature from readily available starting materials, such as the appropriately substituted acetophenone and appropriately substituted benzoic acid compounds or esters thereof.

Among the readily available dibenzoyl methanes may be mentioned the 1,3-propane diodes having the following 1,3-radicals: 1,3-diphenyl; 1,3-di-p-tolyl; 1-(o-methoxyphenyl)-3-phenyl; 1-(p-methoxyphenyl)-3-phenyl; 1-(o-nitrophenyl)-3-phenyl; 1-(p-nitrophenyl)-3-phenyl; 1-(m-nitrophenyl)-3-phenyl; 1,3-bis(p-fluorophenyl); 1,3-bis(p-iodophenyl); 1-(3-bromo-4-methoxyphenyl)-3-phenyl; 1-(p-bromophenyl)-3-phenyl; 1-(p-chlorophenyl)-3-phenyl; 1-(3,4-dichlorophenyl)-3-phenyl; 1-(5-bromo-2-methoxyphenyl)-3-(bromophenyl); 1-(5-bromo-2-methoxyphenyl)-3-phenyl; and 1-(3-bromo-4-methoxyphenyl)-3-p-tolyl and 1-(m-trifluoromethylphenyl)-3-phenyl.

Suitable benzoic acid derivatives useful in the preparation of the halo alkyl dibenzoyl methanes include, for example, those having the following substituents: p-trichloromethyl; o-dibromomethyl; o-2,2,2-trichloroethyl; p-1,2-dibromoethyl; o-dichloromethyl; o-bromomethyl; m-2,2-dibromoethyl; p2-chloroethyl; p-3-chloropropyl and the like.

ILLUSTRATION A

Preparation of 1-Phenyl-3-(m-trifluoromethylphenyl)-propane-1,3-dione

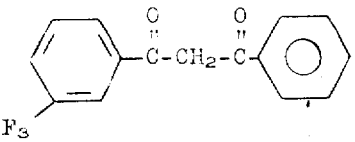

68.4 Grams (0.335 mole) of the methyl ester of m-trifluoromethyl benzoic acid are combined with 36.0 grams (0.3 mole) of acetophenone in 200 ml. of dimethylsulfoxide. 8.04 Grams (0.335 mole) of sodium hydride as a 54 percent mineral oil composition were added and the reaction mixture was stirred overnight. 10 Ml. of 85 percent phosphoric acid was then added to 500 ml. of ice water. The reaction mixture was then added to the ice water composition with stirring until room temperature was achieved. 300 Ml. of water and then added and the solid precipitate which formed was removed by filtration, water washed and dried to produce the desired product having a melting point of 60°–62°C. Purification was effected by recrystallization in ethanol to give a product having a melting point of 63°–64°C.

EXAMPLES 1–7

Preparation of 1-Methyl-3,5-diphenylpyrazole

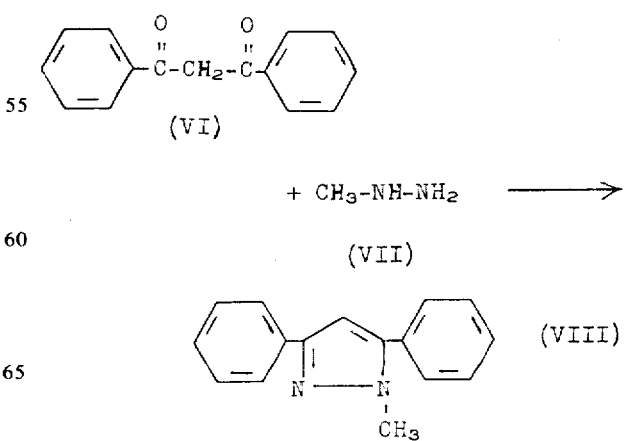

545.0 Grams (2.43 moles) of dibenzoylmethane and 533 ml. of pyridine are stirred together and heated to 80°C. 112 Grams (2.43 moles) of methylhydrazine are then slowly added to the mixture and a strong exothermic reaction ensues necessitating cooling of the mixture with a water bath. When addition is complete, the mixture is heated to reflux and maintained in this condition for 40 minutes. The mixture is then cooled to 30°C., poured into 19 liters of 3N HCl, filtered, and the solid collected. This is reslurried in 198 grams (2.43 moles) of sodium acetate dissolved in 19 liters of water. The mixture is filtered, water washed and air dried to give 535 grams of product, 94.5 percent yield, having melting point 58° to 59°C.

Following the above procedure and substituting ethylhydrazine, n-propylhydrazine, isopropylhydrazine, sec-butylhydrazine, n-butylhydrazine, or isobutylhydrazine for methylhydrazine in the above reaction yields respectively: 1-ethyl-3,5-diphenylpyrazole; 1-n-propyl-3,5-diphenylpyrazole; 1-isopropyl-3,5-diphenylpyrazole; 1-sec-butyl-3,5-diphenylpyrazole; 1-n-butyl-3,5-diphenylpyrazole; and 1-isobutyl-3,5-diphenylpyrazole.

EXAMPLES 8–27

Reaction of the appropriately substituted dibenzoylmethane methane with the appropriate alkylhydrazine under the conditions of Example 1 results in the preparation of 1-alkyl-3,5-substituted diphenylpyrazoles. Graphically, the process may be illustrated as follows:

Among the compounds which can be prepared by this reaction are those identified in the table below. For compounds in this table, Y' and Z' are both hydrogen.

TABLE I

| Ex. No. | Y | Z | $R_1$ | m.p. °C. |
|---|---|---|---|---|
| 8 | Cl (3) | H | $CH_3$ | |
| 9 | Cl (4) | H | $CH_3$ | 127.5–128.5 |
| 10 | Br (4) | H | $CH_3$ | |
| 11 | $NO_2$ (2) | H | $C_2H_5$ | |
| 12 | $CH_3$ (4) | H | $CH_3$ | 101.5–103 |
| 13 | $OCH_3$ (3) | H | $CH_3$ | |
| 14 | $OCH_3$ (4) | H | $CH_3$ | 105–106.5 |
| 15 | Cl (3) | Cl (4) | $CH_3$ | |
| 16 | Br (3) | Br (5) | $C_2H_5$ | |
| 17 | Br (3) | Cl (4) | $CH_3$ | |
| 18 | $CH_3$ (2) | $CH_3$ (6) | $CH_3$ | |
| 19 | $OCH_3$ (3) | $OCH_3$ (4) | $C_3H_7$—n | |
| 20 | Cl (4) | H | $C_4H_9$—sec | |
| 21 | Br (3) | H | $C_4H_9$—n | |
| 22 | $CH_3$ (4) | Cl (3) | $CH_3$ | |
| 23 | $CH_3$ (3) | $OCH_3$ (4) | $CH_3$ | |
| 24 | $NO_2$ (2) | $NO_2$ (6) | $CH_3$ | |
| 25 | $NO_2$ (3) | Br (4) | $C_2H_5$ | |
| 26 | $OCH_3$ (4) | H | $C_4H_9$ —sec | |
| 27 | $CF_3$ (3) | H | $CH_3$ | |

EXAMPLE 28

Preparation of 1,2-Dimethyl-3,5-diphenylpyrazolium p-toluene sulfonate

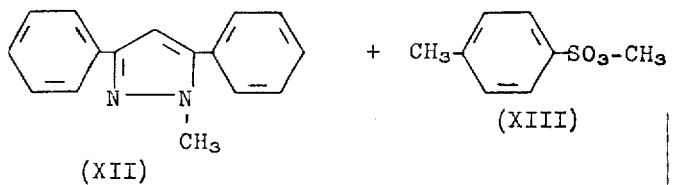

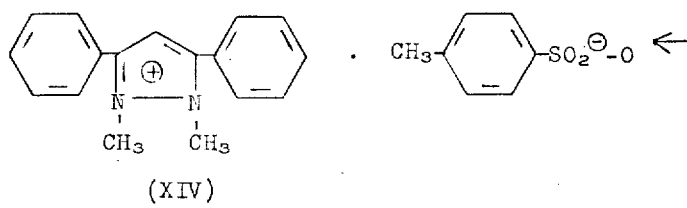

400 Grams (1.71 moles) of 1-methyl-3,5-diphenylpyrazole is dissolved in 2100 ml. of xylene and the solution thus prepared dried by azeotropic distillation. The solution is cooled to 70°C. and 318 grams

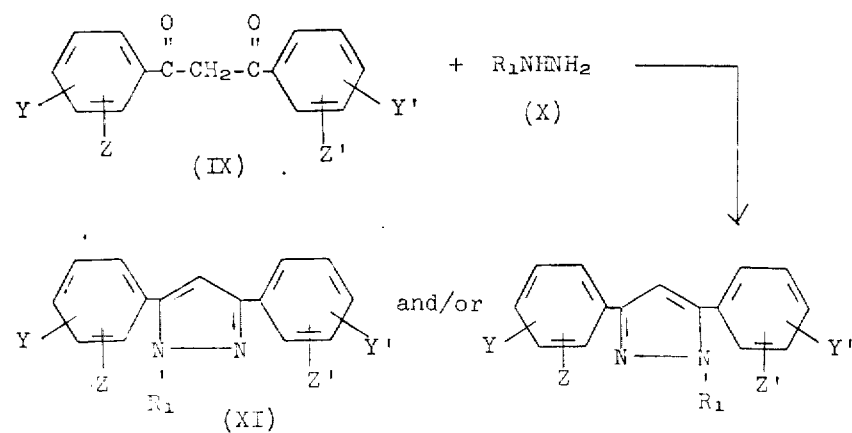

(1.71 moles) of methyl-p-toluene sulfonate is added. The mixture is then refluxed for 1 hour and cooled causing the product to crystallize. When the mixture is cooled to 40°C., 1000 ml. of acetone are added. The mixture is filtered, washed with acetone, and dried in vacuo yielding 495 grams (69 percent) of product having a melting point of 177° to 178°C.

EXAMPLE 29

Preparation of 1,2-Dimethyl-3,5-diphenylpyrazolium iodide 5.0 Grams of 1-methyl-3,5-diphenylpyrazole is dissolved in 30 ml. of dry benzene with heating and constant stirring. 30.4 Grams of methyl iodide is added to the mixture, and the mixture heated to reflux. After refluxing for 12 hours, the mixture is cooled and filtered. The filtrate is again refluxed and as product forms, it is separated from the mixture by filtration. The total amount of solid recovered is 1.21 grams, 15 percent yield, having a melting point of 167° to 169°C.

EXAMPLE 30

Preparation of 1,2-Dimethyl-3,5-diphenylpyrazolium sulfate and methyl sulfate 5.0 Grams of 1-methyl-3,5-diphenylpyrazole is dissolved in 30 ml. of dry xylene with heating and constant stirring. The solution is cooled to 60°C., and 2.78 grams of dimethyl sulfate is added in 10 ml. of xylene. The mixture is then heated to 100°C. for 6 hours and allowed to cool. After cooling, the mixture is filtered. The solid which is recovered is stirred with dry acetone and the mixture filtered. This yields 3.91 grams of the methyl sulfate, 50.7 percent yield, having a melting point of 146° to 148°C.

The filtrate is then evaporated to remove acetone and the remaining residue is collected. The residue weight of 1.23 grams, 16.6 percent yield, is the desired sulfate having a melting point of 188° to 189.5°C.

EXAMPLES 31–46

Following the general procedures of Examples 28, 29 or 30, substituting the appropriately substituted 1-alkyl-3,5-substituted diphenylpyrazole for 1-methyl-3,5-diphenylpyrazole and the appropriate alkyl-p-toluene sulfonate, alkyl halide or alkyl sulfate for the methyl-p-toluene sulfonate, methyl iodide or dimethyl sulfate, yields the corresponding 1,2-dialkyl substituted 3,5-diphenylpyrazolium salt. The reaction is graphically illustrated below:

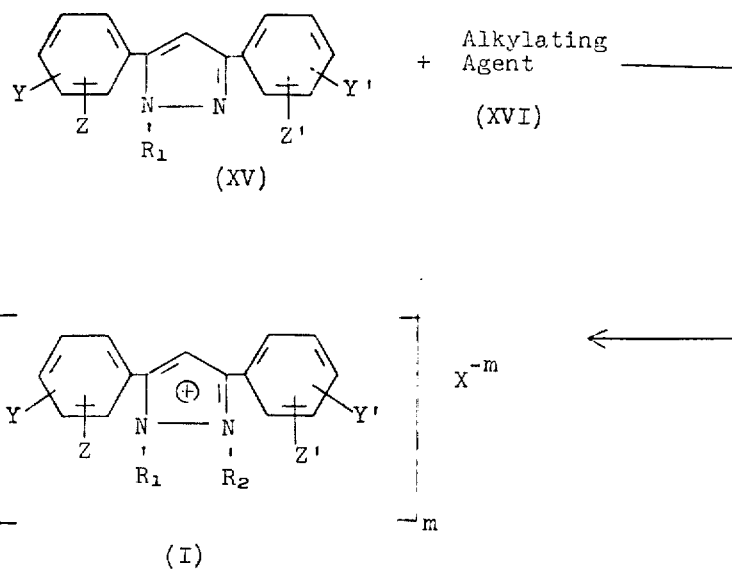

wherein $R_1R_2$, X, Y, Y', Z, Z' and $m$ are as described above for (I).

Among the compounds which can be prepared by this reaction are those identified in the table below where Y' and Z' are both hydrogen, and $m$ is 1.

TABLE II

Reactants and Products

| Ex. No. | Y | Z | $R_1$ | Alkylating Agent | $R_2$ | X | melting point °C. |
|---|---|---|---|---|---|---|---|
| 31 | Cl (3) | H | $CH_3$ | $CH_3$-⟨ ⟩-$SO_2$-$OCH_3$ | $CH_3$ | $C_7H_7SO_3$ | |
| 32 | Br (4) | H | $CH_3$ | $CH_3$-⟨ ⟩-$SO_2$-$OC_2H_5$ | $C_2H_5$ | $C_7H_7SO_3$ | |

TABLE II cont'd.

Reactants and Products

| Ex. No. | Y | Z | $R_1$ | Alkylating Agent | $R_2$ | X | melting point °C |
|---|---|---|---|---|---|---|---|
| 33 | $NO_2$ (2) | H | $C_2H_5$ | $C_2H_5I$ | $C_2H_5$ | I | |
| 34 | $CH_3$ (4) | H | $CH_3$ | $(CH_3)_2SO_4$ | $CH_3$ | $CH_3SO_4$ | 174-176 |
| 35 | $OCH_3$ (3) | H | $CH_3$ | $CH_3\text{-}C_6H_4\text{-}SO_2\text{-}OCH_3$ | $CH_3$ | $C_7H_7SO_3$ | |
| 36 | Cl (3) | Cl (4) | $CH_3$ | $CH_3I$ | $CH_3$ | I | |
| 37 | Br (3) | Br (5) | $C_2H_5$ | $C_2H_5I$ | $C_2H_5$ | I | |
| 38 | $CH_3$ (2) | $CH_3$ (6) | $CH_3$ | $n\text{-}C_3H_7I$ | $C_3H_7\text{-}n$ | I | |
| 39 | $OCH_3$ (3) | $OCH_3$ (5) | $C_3H_7\text{-}n$ | $i\text{-}C_3H_7Br$ | $C_3H_7\text{-}i$ | Br | |
| 40 | Cl (4) | H | $C_4H_9\text{-}sec$ | $CH_3I$ | $CH_3$ | I | |
| 41 | Cl (4) | H | $C_4H_9\text{-}sec$ | $sec\text{-}C_4H_9Br$ | $C_4H_9\text{-}sec$ | Br | |
| 42 | $CH_3$ (4) | Cl (3) | $CH_3$ | $CH_3I$ | $CH_3$ | I | |
| 43 | $OCH_3$ (4) | H | $CH_3$ | $(CH_3)_2SO_4$ | $CH_3$ | $CH_3SO_4$ | 137-138.5 |
| 44 | $OCH_3$ (4) | H | $CH_3$ | $CH_3\text{-}C_6H_4\text{-}SO_3CH_3$ | $CH_3$ | $C_7H_7SO_3$ | 127.5-129 |
| 45 | H | H | $C_2H_5$ | $(C_2H_5)_2SO_4$ | $C_2H_5$ | $C_2H_5SO_4$ | 109-111 |
| 46 | $CH_3$ (4) | H | $CH_3$ | $CH_3\text{-}C_6H_4\text{-}SO_2OCH_3$ | $CH_3$ | $C_7H_7SO_2$ | 150-151.5 |
| 46a | F (3) | H | $CH_3$ | $(CH_3)_2SO_4$ | $CH_3$ | $CH_3SO_4$ | 120-122 |

EXAMPLE 47

Preparation of 3,5-Diphenylpyrazole 22.4 Grams (0.10 moles) of dibenzoylmethane in 200 ml. of isopropyl alcohol are heated to reflux (approximately 85°C.), and to this is added hydrazine hydrate at a rate sufficient to maintain reflux. Thirty minutes after addition, the reaction is complete. The reaction mixture is permitted to cool and is then poured into water. The desired product as a fine white solid precipitates and is filtered, washed with cold water and dried, yielding 22.1 grams of product, melting point 198.5° to 200.5°C.

EXAMPLE 48

Preparation of 1-Methyl-3,5-diphenylpyrazole 5.0 Grams (0.022 moles) of dibenzoylmethane in 40 ml. of n-propyl alcohol is heated to 80° to 90°C., and 10.5 grams of methyl hydrazine in 10 ml. of n-propyl alcohol slowly added thereto. The mixture is maintained at 95°C. for 30 minutes and then poured into 600 ml. of ice water.

An oil separates and turns solid after one-half hour. The solid is filtered, washed with cold water and dried to give 5.2 grams of the desired product having a melting point of 58° to 59°C.

EXAMPLE 49

Preparation of 1-Methyl-3,5-diphenylpyrazole 5.0 Grams of dibenzoylmethane in 40 ml. of isopropanol is heated to 50°C. The temperature of the reaction mixture is then raised to about 85°C. and 10.5 grams of methyl hydrazine in 10 ml. of isopropanol added thereto. The mixture is heated at this temperature for 30 minutes, then cooled and cold water added thereto. A white solid precipitate forms and is filtered, washed and dried to yield 5.22 grams of product having a melting point of 59.5° to 60°C., 99+ percent yield.

EXAMPLES 50-51

Preparation of 1-Methyl-3,5-diphenylpyrazole 2.20 Grams (0.01 moles) of 3,5-diphenylpyrazole is mixed with 0.4 grams of sodium hydroxide in 3 ml. of water. To this mixture is added 1.32 grams (0.01 moles) of dimethylsulfate in 5 ml. of n-propyl alcohol. During addition, the temperature of the reaction mixture is maintained below 30°C. by means of an ice bath, but when addition is complete the temperature is increased to 40°C. The mixture is then poured into water where a solid forms, is filtered off, washed with water and dried to give 2.18 grams of the desired product, 53 percent yield.

17

The above procedure is repeated with the exception that 0.54 grams of sodium methoxide is substituted for the sodium hydroxide and water. 2.34 Grams of the desired product are obtained with an improvement in yield to 77 percent.

EXAMPLE 52

Preparation of 1-Methyl-3,5-diphenylpyrazole

Methyl chloride is condensed in a pressure vessel at −45°C. At this temperature, 2.20 grams (0.01 moles) of 3,5-diphenylpyrazole dissolved in n-propanol (dry) are added slowly. Then sodium methoxide dissolved in 25 ml. of dry propanol is added and the pressure vessel sealed. The pressure vessel is brought to room temperature and stirred overnight and then heated to 40° to 45°C. for 8 hours. The reaction mixture is poured into water where a white solid forms. The mixture is filtered and the solid washed with water and dried, yielding 2.21 grams of the desired product, 55 percent yield.

EXAMPLE 53

Preparation of 1,2-Dimethyl-3,5-diphenylpyrazolium Perchlorate 4.7 Grams (0.02 moles) of 1-methyl-3,5-dipheneylpyrazole is added to a solution of methyl chloride, 1.5 grams (0.03 moles) in 35 ml. of n-propanol maintained at −40°C. The mixture is then heated to 100°C. and evaporated to a bright green oil. On addition of hexane and cooling, the crude pyrazolium chloride as a green solid precipitates. The solid is washed with water and dissolved in 60 ml. of $H_2O$ and then $HClO_4$ added. The pyrazolium perchlorate as a white precipitate forms. It is filtered, washed with water and dried to yield the desired product.

EXAMPLE 54

Preparation of 1,2-Dimethyl-3,5-diphenylpyrazolium Methylsulfate 2.34 Grams (0.01 moles) of 1-methyl-3,5-diphenylpyrazole is added to 10 ml. of isopropanol and heated to 60°C. 1.5 Grams (0.012 moles) of dimethylsulfate in 2 ml. of isopropanol is then added, and the mixture heated to reflux for 48 hours. The mixture is then cooled, filtered, slurried in dry acetone and refiltered and dried to give the desired product having a melting point of 147° to 150°C.

EXAMPLE 55

Preparation of 1,2-Dimethyl-3,5-diphenylpyrazolium Methylsulfate

375 Grams (1.6 moles) of 1-methyl-3,5-diphenylpyrazole is dissolved in 1,850 ml. of dry xylene and heated to 60°C. 208.13 Grams (1.65 moles) of dimethylsulfate in 150 ml. of dry xylene is then added and the temperature of the reaction mixture raised to 105° to 110°C. and maintained there for 7.5 hours. The mixture is allowed to cool and then filtered. A brown solid is recovered, washed with xylene and then dry acetone to give the product in 88 percent yield, having a melting point of 155° to 157°C.

EXAMPLE 56

Preparation of 1,2-Dimethyl-3,5-diphenylpyrazolium bromide

A glass column is packed with a commercial grade of a trimethyl benzyl ammonium chloride, strong base organic anion exchange resin. The resin is washed thoroughly with an aqueous sodium bromide solution of 1 N concentration until $Br^-$ ion is detected in the eluent. Then an aqueous solution of 1,2-dimethyl-3,5-diphenylpyrazolium p-toluene sulfonate is passed down the column at a slow rate. The eluent is concentrated in vacuo, leaving the desired product as a residue after drying with a melting point of 188°–189°C.

Analysis: Calcd. for $C_{17}H_{17}N_2Br$: C, 62.01; H, 5.22; N, 8.54; Br, 24.22. Found: C, 61.98; H, 5.30; N, 8.54; Br, 24.27.

EXAMPLES 57–62

Following the general procedure of Example 56 above, substituting the appropriate sodium salt for the sodium bromide used therein and the appropriate pyrazolium p-toluene sulfonate for that used therein yields the compounds having the following formula and substituents set forth in the table below.

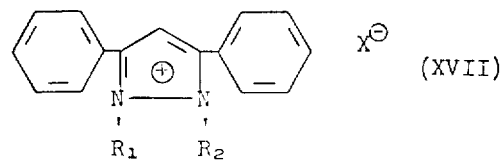

TABLE III

| Ex. No. | m.p. °C. | $R_1$ | $R_2$ | X |
|---|---|---|---|---|
| 57 | 100.5–103 | $CH_3$ | $CH_3$ | $OH.(3H_2O)$ |
| 58 | 56–58 | $CH_3$ | $CH_3$ | ½ $SO_4.(2H_2O)$ |
| 59 | 140–141.5 | $CH_3$ | $CH_3$ | $NO_3$ |
| 60 | 188–189 | $CH_3$ | $CH_3$ | Br |
| 61 | 179.5–181 | $CH_3$ | $CH_3$ | Cl.½ $H_2O$ |
| 62 | 168–169 | $CH_3$ | $CH_3$ | I |

EXAMPLE 63

Preparation of 1,2-Dimethyl-3,5-diphenylpyrazolium perchlorate

To a solution of 1,2-dimethyl-3,5-diphenylpyrazolium p-toluene sulfonate (10.0 g.) in 500 ml. of water is added a 20 percent aqueous solution of perchloric acid with vigorous stirring. The product separates immediately as a white solid. It is collected by filtration, washed with water and dried to give 8.3 g. of the desired product having a melting point of 183°–184°C., and the following elemental analysis:

Calcd. for $C_{17}H_{17}ClN_2O_4$: C, 58.75; H, 4.92; N, 8.05. Found: C, 58.21; H, 4.84; N, 7.95.

EXAMPLES 64–67

Following the general procedure of Example 63, substituting the appropriate pyrazolium p-toluene sulfonate for that used therein results in the formation of the perchlorates set forth in the table below.

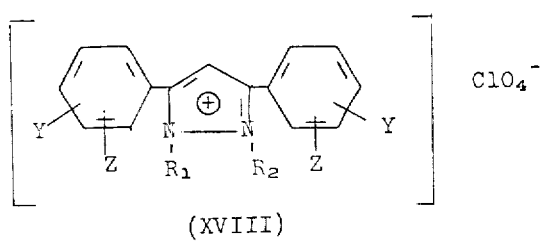

(XVIII)

TABLE IV

| Ex. No. | Y | Z | R₁ | R₂ | m.p. °C. |
|---|---|---|---|---|---|
| 64 | Cl (4) | H | CH₃ | CH₃ | 192.5–194 |
| 65 | H | H | CH₃ | —C₃H₇—n | 145–146.5 |
| 66 | CH₃ (4) | H | CH₃ | CH₃ | 132–134 |
| 67 | CH₃O (4) | H | CH₃ | CH₃ | 159.5–161 |

EXAMPLE 68

Preparation of 1,2-Dimethyl-3,5-diphenylpyrazolium triiodide

To a solution of 2.0 grams (0.0053 moles) of 1,2-dimethyl-3,5-diphenylpyrazolium iodide in 100 ml. of aqueous ethanol (1:1) was added 1.34 grams (0.0053 moles) of iodine. The reaction mixture was allowed to sit with the resultant formation of a red precipitate.

The precipitate was collected by filtration, washed with aqueous ethanol and air dried to produce 3.0 grams of the desired triiodide having a melting point of 108°–110°C. and the following elemental analysis:

Calculated: C, 32.41%; H, 2.72%; N, 4.44%; I, 61.45%
Found: C, 32.23%; H, 2.78%; N, 4.43%; I, 60.29%.

EXAMPLES 69–104

Following the general ring closing procedure of Example 1 and the alkylation procedure of Example 31, employing methylhydrazine and the appropriate diketones and alkylating agents yields the pyrazolium salts of the following formula, having the substituents set forth in the table below.

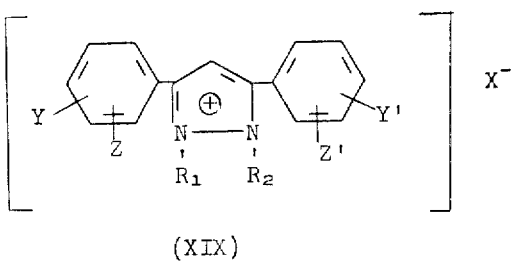

(XIX)

TABLE V

| Ex. No. | X | Y | Y' | Z | Z' | R₁ | R₂ | melting point °C |
|---|---|---|---|---|---|---|---|---|
| 69 | —OSO₂—C₆H₄—CH₃ | H | Cl (4) | H | H | CH₃ | CH₃ | 177.5–179 |
| 70 | —OSO₃—CH₃ | H | Cl (4) | H | H | CH₃ | CH₃ | over 340 |
| 71 | —OSO₃—CH₃ | H | Cl (4) | H | H | CH₃ | CH₃ | 217–219 |
| 72 | ClO₄ | H | Cl (4) | H | H | CH₃ | CH₃ | 136.5–138 |
| 73 | ClO₄ | H | H | H | H | CH₃ | C₃H₇-n | 145–146.5 |
| 74 | C₂H₅—SO₃—O— | H | H | H | H | CH₃ | C₂H₅ | 109–111 |
| 75 | CH₃SO₃O— | H | CH₃ (4) | H | H | CH₃ | CH₃ | 107–110 |
| 76 | ClO₄ | H | Cl (3) | H | H | CH₃ | CH₃ | 157–160 |
| 77 | ClO₄ | H | Cl (2) | H | H | CH₃ | CH₃ | 124–128 |
| 78 | CH₃SO₃—O— | H | CH₃ (3) | H | H | CH₃ | CH₃ | purple gum |
| 79 | ClO₄ | H | CH₃ (2) | H | H | CH₃ | CH₃ | 166–170 |
| 80 | ClO₄ | H | CH₃O (4) | H | H | CH₃ | CH₃ | 152–156 |
| 81 | CH₃SO₃O— | H | Cl (3) | H | Cl (5) | CH₃ | CH₃ | 162–164 |
| 82 | CH₃SO₃O— | H | CH₃ (3) | H | H | CH₃ | CH₃ | brown gum |
| 83 | HSO₄ | H | Cl (2) | H | H | CH₃ | CH₃ | purple gum |
| 84 | CH₃SO₃O— | H | CH₃ (2) | H | H | CH₃ | CH₃ | brown gum |
| 85 | ClO₄ | Cl (3) | H | Cl (5) | H | CH₃ | CH₃ | 183–185 |
| 86 | CH₃SO₃O— | Cl (3) | H | Cl (4) | H | CH₃ | CH₃ | 152–153 |
| 87 | HSO₄ | Cl (4) | Cl (4) | H | H | CH₃ | CH₃ | 263–264 |
| 88 | CH₃SO₃O— | Cl (4) | Cl (4) | H | H | CH₃ | CH₃ | 180–182 |
| 89 | CH₃SO₃O— | H | H | CH₃ (4) | CH₃ (4) | CH₃ | CH₃ | 174–176 |
| 90 | CH₃—C₆H₄—SO₂—O— | H | H | CH₃ (4) | CH₃ (4) | CH₃ | CH₃ | 150–151.5 |

TABLE V cont'd.

| Ex. No. | X | Y | Y' | Z | Z' | R₁ | R₂ | melting point °C. |
|---|---|---|---|---|---|---|---|---|
| 91 | HSO₄ | Cl (4) | H | H | H | CH₃ | CH₃ | 217-219 |
| 92 | CH₃-C₆H₄-SO₂-O- | CH₃O (4) | CH₃O (4) | H | H | CH₃ | CH₃ | 127.5-129 |
| 93 | CH₃SO₃O- | CH₃O (4) | CH₃O (4) | H | H | CH₃ | CH₃ | 137-138.5 |
| 94 | ClO₄ | Cl (3) | H | Cl (4) | H | CH₃ | CH₃ | 138-140 |
| 95 | ClO₄ | CH₃ (3) | H | H | H | CH₃ | CH₃ | 121-124 |
| 96 | ClO₄ | CH₃O (4) | Cl (4) | H | H | CH₃ | CH₃ | 170-172 |
| 97 | HSO₄ | NO₂ (4) | NO₂ (4) | H | H | CH₃ | CH₃ | |
| 98 | CH₃SO₃O- | Cl (3) | Cl (3) | H | H | CH₃ | CH₃ | |
| 99 | ClO₄ | H | H | H | H | C₂H₅ | C₂H₅ | 140-143 |
| 100 | CH₃SO₃O- | F (3) | H | H | H | CH₃ | CH₃ | |
| 101 | CH₃SO₃O- | Cl (2) | H | Cl (5) | H | CH₃ | CH₃ | |
| 102 | CH₃SO₃O- | CF₃ (3) | H | H | H | CH₃ | CH₃ | 140-144 |
| 103 | HSO₄·1/2H₂O | NO₂ (4) | NO₂ (4) | H | H | CH₃ | CH₃ | |
| 104 | CH₃SO₃O- | CH₃ (3) | H | CH₃ (5) | H | CH₃ | CH₃ | |

EXAMPLES 105-106

Preparation of 1,2-Dimethyl-3,5-diphenylpyrazolium sulfate and hydrogen sulfate

To a dry xylene (30 ml.) solution of 1-methyl-3,5-diphenylpyrazole (5.0 g., .02 mole) at 60°C. was added dimethylsulfate (2.78 g., 0.022 mole) is xylene (10 ml.). The reaction mixture was stirred and heated at 100°C. during 6 hours, cooled to room temperature and set aside overnight. A crystalline solid was filtered off, washed with dry acetone and filtered to give the methyl sulfate 3.91 grams, m.p. 146°-148°C.

The acetone filtrate was evaporated to a solid residue which was washed with ice cold acetone, filtered and dried to give 1.23 grams (17 percent) of the hydrogen sulfate having a melting point of 188°-189.5°C.

EXAMPLES 107-139

The selective postemergence herbicidal activity of the compounds of the present invention is demonstrated by the following tests, wherein a variety of monocotyledonous anad dicotyledonous plants are treated with test compounds dispersed in aqueous acetone mixtures. In the tests, seedling plants are grown in jiffy flats for about two weeks. The test compounds are dispersed in 50/50 acetone/water mixtures containing 0.5 percent Tween 20, a polyoxyethylene sorbitan monolaurate surfactant by Atlas Chemical Industries, in sufficient quantity to provide the equivalent of about 0.5 lb. to 9 lbs. per acre of active compound when applied to the plants through a spray nozzle operating at 40 psi. for a predetermined time. After spraying, the plants are placed on greenhouse benches and are cared for in the usual manner, commensurate with conventional greenhouse practices. Two weeks after treatment, the seedling plants are examined and rated according to the rating system provided below. The data obtained are reported in Table VI where it can be seen that the compounds are uniquely effective for the control wild oats. The specificity is demonstrated by the findings that wheat is not injured or only very mildly affected by the compounds at rates which provide effective control of the wild oats.

| Rating System: | | % Difference in Growth from the Check[1] |
|---|---|---|
| 0 - | no effect | 0 |
| 1 - | possible effect | 1-10 |
| 2 - | slight effect | 11-25 |
| 3 - | moderate effect | 26-40 |
| 5 - | definite injury | 41-60 |
| 6 - | herbicidal effect | 61-75 |
| 7 - | good herbicidal effect | 76-90 |
| 8 - | approaching complete kill | 91-99 |
| 9 - | complete kill | 100 |
| 4 - | abnormal growth, that is, a definite physiological malformation but with an over-all effect less than a 5 on the rating scale. | |

[1] Based on visual determination of stand, size, vigor, chlorosis, growth malformation and over-all plant appearance.

| Plant Abbreviation: | | |
|---|---|---|
| | LA - | Lambsquarters (*Chenopodium album*) |
| | MU - | Mustard (*Brassica kaber*) |
| | PI - | Pigweed (*Amaranthus retroflexus*) |
| | BA - | Barnyard grass (*Echinochloa crusgalli*) |
| | CR - | Crabgrass (*Digitaria sanguinalis*) |
| | GRF - | Green foxtail (*Setaria viridis*) |
| | WO - | Wild oats (*Avena fatua*) |
| | COR - | Corn (*Zea mays*) |
| | COT - | Cotton (*Gossypium hirsutum*) |
| | SOY - | Soybean (*Glycine max*) |
| | RAG - | Ragweed (*Ambrosia artemisiifolia*) |
| | WH - | Wheat (*Triticum vulgare*) |
| | MG - | Morning Glory (*Ipomoca purpurea*) |
| | Barley - | (*Hordeum vulgare*) |

TABLE VI

Postemergence Herbicidal Activity

| Ex. No. | Structure | Treatment lb./acre | Annual Weeds ||||||||| Crops ||||
|---|---|---|---|---|---|---|---|---|---|---|---|---|---|---|---|
| | | | LA | MU | PI | RAG | MG | FA | CR | GRF | WO | COR | COT | SOY | WH |
| 107 | [structure] · CH₃-C₆H₄-SO₂-O⁻ | 9<br>3<br>1<br>1/2 | 1<br>1<br>0<br>0 | 3<br>1<br>0<br>0 | 5<br>1<br>0<br>0 | 9<br>5<br>0<br>0 | | 0<br>0<br>0<br>0 | 0<br>0<br>0<br>0 | 1<br>0<br>0<br>0 | 8<br>8<br>7<br>4 | 7<br>5<br>5<br>3 | 9<br>8<br>8<br>5 | 7<br>3<br>1<br>1 | 2<br>1<br>0<br>0 |
| 108 | [structure] · I⁻ | 9<br>3<br>1<br>1/2 | 1<br>0<br>0<br>0 | 9<br>1<br>0<br>0 | 5<br>1<br>0<br>0 | 9<br>1<br>0<br>0 | | 1<br>0<br>0<br>0 | 2<br>0<br>0<br>0 | 8<br>8<br>0<br>0 | 8<br>7<br>7<br>4 | 7<br>3<br>3<br>3 | 8<br>7<br>3<br>3 | 7<br>3<br>3<br>0 | 1<br>1<br>0<br>0 |
| 109 | [structure] · HOSO₂-O⁻ | 9<br>3<br>1<br>1/2 | 9<br>1<br>0<br>0 | 9<br>5<br>0<br>0 | 5<br>1<br>0<br>0 | 9<br>7<br>1<br>0 | | 0<br>0<br>0<br>0 | 9<br>1<br>0<br>0 | 8<br>8<br>0<br>0 | 9<br>8<br>7<br>4 | 7<br>5<br>3<br>3 | 9<br>9<br>9<br>7 | 9<br>6<br>3<br>3 | 1<br>1<br>0<br>0 |
| 110 | [structure] · (CH₃O)SO₂-O⁻ | 9<br>3<br>1<br>1/2 | 3<br>1<br>0<br>0 | 8<br>1<br>0<br>0 | 9<br>1<br>0<br>0 | 8<br>6<br>2<br>0 | | 1<br>0<br>0<br>0 | 2<br>1<br>0<br>0 | 7<br>0<br>0<br>0 | 9<br>7<br>4<br>4 | 7<br>5<br>7<br>3 | 9<br>9<br>7<br>1 | 5<br>2<br>2<br>1 | 1<br>0<br>0<br>0 |

| Ex. No. | Structure | Treatment lb./acre | Annual Weeds ||||||||| Crops ||||
|---|---|---|---|---|---|---|---|---|---|---|---|---|---|---|---|
| | | | LA | MU | PI | RAG | MG | FA | CR | GRF | WO | COR | COT | SOY | WH | Barley |
| 111 | [structure] · ClO₄ | 10<br>4<br>2 | 9<br>-<br>- | 9<br>-<br>- | 9<br>-<br>- | 7<br>-<br>- | 7<br>-<br>- | 7<br>-<br>- | 8<br>-<br>- | 5<br>-<br>- | 8<br>7<br>5 | | | | -<br>-<br>- | -<br>-<br>- |
| 112 | [structure] · C₂H₅O-SO₂-O | 10<br>4<br>2<br>1<br>1/2 | 9<br>0<br>0<br>-<br>- | 9<br>-<br>-<br>-<br>- | 9<br>-<br>-<br>-<br>- | 7<br>-<br>-<br>-<br>- | 8<br>-<br>-<br>-<br>- | .7<br>0<br>-<br>-<br>- | 7<br>-<br>-<br>-<br>- | 2<br>0<br>-<br>-<br>- | 6<br>9<br>8<br>8<br>8 | | | | 0<br>- | -<br>- |
| 113 | [structure] · CH₃O-SO₂-O | 10<br>4<br>2<br>1 | 9<br>0<br>0<br>0 | 9<br>-<br>-<br>- | 9<br>-<br>-<br>- | 8<br>-<br>-<br>- | 6<br>-<br>-<br>- | 8<br>0<br>0<br>0 | 9<br>-<br>-<br>- | 7<br>0<br>0<br>0 | 8<br>9<br>9<br>8 | | | | 0<br>0<br>0 | -<br>-<br>- |
| 114 | [structure] · CH₃O-SO₂-O | 10<br>3 | 9<br>8 | 9<br>9 | 9<br>9 | 9<br>3 | 2<br>5 | 1<br>3 | 1<br>3 | 1<br>2 | 5<br>7 | | | | | |
| 115 | [structure] · ClO₄ | 10<br>4<br>1<br>1/2 | 8<br>-<br>-<br>- | 9<br>9<br>9<br>0 | 7<br>9<br>2<br>0 | 7<br>-<br>-<br>- | 2<br>3<br>2<br>0 | 2<br>0<br>-<br>- | 2<br>0<br>-<br>- | 2<br>0<br>-<br>- | 7<br>7<br>5<br>5 | | | | -<br>0<br>0<br>0 | 1<br>0<br>0<br>0 |
| 116 | [structure] · ClO₄ | 10 | 8 | 9 | 9 | 3 | 2 | 3 | 3 | 3 | 6 | | | | | |
| 117 | [structure] · CH₃O-SO₂-O | 10<br>4<br>1<br>1/2 | 9<br>-<br>-<br>- | 8<br>9<br>9<br>7 | 9<br>9<br>1<br>1 | 3<br>-<br>-<br>- | 6<br>3<br>0<br>0 | 6<br>0<br>0<br>0 | 2<br>0<br>0<br>0 | 6<br>2<br>0<br>0 | 9<br>7<br>7<br>5 | | | | -<br>0<br>0<br>0 | -<br>0<br>0<br>0 |
| 118 | [structure] · ClO₄ | 10<br>4<br>1<br>1/2 | 9<br>-<br>-<br>- | 9<br>9<br>5<br>0 | 9<br>9<br>0<br>0 | 3<br>-<br>-<br>- | 2<br>6<br>0<br>0 | 5<br>6<br>0<br>0 | 3<br>6<br>0<br>0 | 2<br>3<br>0<br>0 | 8<br>8<br>7<br>6 | | | | -<br>0<br>0<br>0 | -<br>0<br>0<br>0 |

TABLE VI cont'd.
Postemergence Herbicidal Activity

| Ex. No. | Structure | Treatment lb./acre | Annual Weeds ||||||||| Crops ||||
|---|---|---|---|---|---|---|---|---|---|---|---|---|---|---|---|
| | | | LA | MU | PI | RAG | VL | BA | CR | GRF | MO | COR | COT | SOY | WH |
| 119 | CH₃O-phenyl-pyrazolium-phenyl · ClO₄ | 10 | 9 | 9 | 9 | 1 | 1 | 3 | 2 | 3 | 7 | | | | |
| 120 | 2,4-Cl₂-phenyl-pyrazolium-phenyl · CH₃O-SO₂-O | 10 | 9 | 9 | 9 | 6 | 3 | 1 | 1 | 3 | 9 | | | | |
| 121 | CH₃-phenyl-pyrazolium-phenyl · CH₃O-SO₂-O | 10 | 9 | 9 | 9 | 7 | 8 | 3 | 1 | 1 | 8 | | | | |
| 122 | Cl-phenyl-pyrazolium-phenyl · CH₃-C₆H₄-SO₂O | 10 / 4 | 9/- | 7/- | 9/- | 7/- | 6/- | 8/- | 7/- | 3/- | 9/6 | | | | |
| 123 | Cl-phenyl-pyrazolium-phenyl · HSO₄ | 10 | 9 | 9 | 9 | 5 | 3 | 7 | 7 | 2 | 8 | | | | |
| 124 | Cl-phenyl-pyrazolium-phenyl · CH₃SO₃O | 10 | 8 | 8 | 6 | 5 | 2 | 2 | 2 | 1 | 3 | | | | |
| 125 | CH₃-phenyl-pyrazolium-phenyl · ClO₄ | 10 / 3 | 9/- | 9/9 | 9/9 | 3/- | 5/3 | 6/3 | 2/2 | 6/3 | 9/7 | | | | |
| 126 | 2,4-Cl₂-phenyl-pyrazolium-phenyl · ClO₄ | 10 | 9 | 9 | 9 | 7 | 1 | 3 | 2 | 3 | 8 | | | | |
| 127 | 2,4-Cl₂-phenyl-pyrazolium-phenyl · CH₃SO₃O | 10 | 9 | 9 | 9 | 6 | 8 | 1 | 1 | 1 | 7 | | | | |
| 128 | 2,5-Cl₂-phenyl-pyrazolium-phenyl · ClO₄ | 10 | 9 | 9 | 9 | 3 | 2 | 1 | 1 | 2 | 2 | | | | |
| 129 | (CH₃)₂-phenyl-pyrazolium-phenyl · CH₃SO₃O | 10 | 8 | 5 | 9 | 2 | 2 | 2 | 1 | 1 | 6 | | | | |
| 130 | Cl-phenyl-pyrazolium-phenyl · ClO₄ | 10 | 9 | 8 | 9 | 3 | 3 | 7 | 7 | 5 | 6 | | | | |

TABLE VI cont'd.

Postemergence Herbicidal Activity

| Ex. No. | Structure | Treatment lb./acre | Annual Weeds | | | | | | | | | Crops | | | |
|---|---|---|---|---|---|---|---|---|---|---|---|---|---|---|---|
| | | | LA | MU | PI | RAG | MG | BA | CR | GRF | WO | COR | COT | SOY | WH |
| 131 | Cl-⟨⟩-⟨N⊕-N⟩-⟨⟩ · HSO₄<br>  CH₃ CH₃ | 10 | 9 | 8 | 9 | 0 | 2 | 5 | 5 | 3 | 3 | | | | |
| 132 | Cl-⟨⟩-⟨N⊕-N⟩-⟨⟩-Cl · HSO₄<br>  CH₃ CH₃ | 10 | 9 | 8 | 9 | 0 | 2 | 5 | 5 | 3 | 3 | | | | |
| 133 | Cl-⟨⟩-⟨N⊕-N⟩-⟨⟩-Cl · CH₃SO₃O<br>  CH₃ CH₃ | 10 | 9 | 8 | 9 | 0 | 3 | 5 | 3 | 2 | 5 | | | | |
| 134 | CH₃-⟨⟩-⟨N⊕-N⟩-⟨⟩-CH₃ · ClO₄<br>  CH₃ CH₃ | 10 | 9 | 9 | 9 | 7 | 7 | 8 | 9 | 6 | 7 | | | | |
| 135 | CH₃-⟨⟩-⟨N⊕-N⟩-⟨⟩-CH₃ · CH₃SO₃O<br>  CH₃ CH₃ | 10 | 9 | 9 | 9 | 9 | 8 | 7 | 9 | 7 | 8 | | | | |
| 136 | CH₃-⟨⟩-⟨N⊕-N⟩-⟨⟩-CH₃ · CH₃-⟨⟩-SO₂O | 10 | 9 | 9 | 9 | 8 | 8 | 8 | 9 | 7 | 9 | | | | |
| 137 | CH₃O-⟨⟩-⟨N⊕-N⟩-⟨⟩-OCH₃ · CH₃-⟨⟩-SO₂O | 10 | 9 | 9 | 9 | 7 | 7 | 6 | 8 | 2 | 7 | | | | |
| 138 | CH₃O-⟨⟩-⟨N⊕-N⟩-⟨⟩-OCH₃ · CH₃SO₃O<br>  CH₃ CH₃ | 10 | 9 | 9 | 9 | 3 | 3 | 7 | 9 | 2 | 5 | | | | |
| 139 | CH₃O-⟨⟩-⟨N⊕-N⟩-⟨⟩-OCH₃ · ClO₄<br>  CH₃ CH₃ | 10 | 9 | 8 | 9 | 5 | 3 | 8 | 9 | 3 | 7 | | | | |

EXAMPLE 140

The selective postemergence control of wild oats in the presence of wheat and barley is demonstrated in the following tests.

Wild oats, wheat and barley are grown in metal flats, 12 inches×8 inches×3½ inches, in the greenhouse. Test compounds are dissolved in 50/50 acetone/water mixtures in sufficient quantity to provide the equivalent of 0.5 lb. and 1.0 lb. per acre of test compound when applied to the plants through a spray nozzle operating at 40 psi. for a predetermined time. Applications are made to the growing plants when the plants reach the one-, two-, three-, or four-leaf stage. Three weeks after treatment, the foliage of the treated and non-treated control plants are cut, gathered, and weighed. The results obtained, which are set forth in Table VII below, are expressed as percent inhibition of fresh weight of treated plant foliage as compared with the untreated control treatment.

TABLE VII

Fresh Weight of Plant Foliage Expressed as Percent Inhibition

EXAMPLE 141

The selectivity and specificity of the compounds of the present invention for controlling wild oats in the presence of wheat and barley is demonstrated by the following tests.

In these tests, field plots in North Dakota, United States of America, with a past history of heavy infestation of wild oads (*Avena fatua*), were plants with hard red spring wheat and spring barley. The plots were 8 feet×24 feet and sprayed at the two- or four-leaf stages of the wild oats, in sufficient amount to provide 1 or 2 lbs. per acre of 1,2-dimethyl-3,5-diphenylpyrazolium p-toluene sulfonate. Seven weeks after planting (or 3 and 5 weeks after treatment), the plots were examined and rated according to the rating system provided in a previous example. A 2 lbs. per gallon water-miscible concentrate was used that had the following analysis in weight percent.

| Ingredient | % |
|---|---|
| 1,2-Dimethyl-3,5-diphenyl-pyrazolium p-toluene sulfonate | 23.6 |
| ethylene glycol mono-methyl ether | 76.4 |
| Total | 100.0 |

The results obtained are set forth in Table VIII below for the four replications numbered I to IV.

We claim:

1. A compound having the formula:

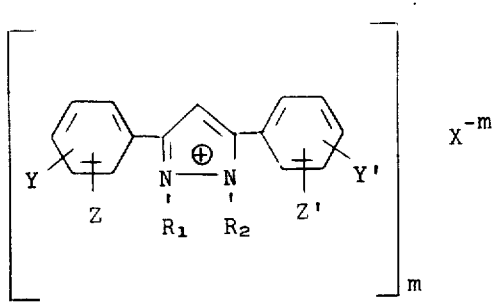

wherein $R_1$ and $R_2$ each represent lower alkyl of 1 to 4 carbon atoms; Y, Y', Z and Z' each independently represent a member selected from the group consisting of hydrogen; halogen; nitro; alkyl of 1 to 4 carbon atoms; haloalkyl of 1 to 4 carbon atoms; alkoxy of 1 to 4 carbon atoms; $m$ is an integer selected from 1, 2 and 3; and, X represents an anion selected from the group of: acetate, sulfate, hydroxide, hydrogen sulfate, methyl sulfate, benzene sulfonate, a 1 to 4 carbon atom, alkoxybenzene sulfonate; a 1 to 3 carbon atom alkylbenzene sulfonate, nitrate, phosphate, carbonate and alkane sulfonate of 1 to 4 carbon atoms.

TABLE VIII

2. The compound: 1,2-dimethyl-3,5-diphenylpyrazolium methyl sulfate.

3. The compound: 1,2-dimethyl-3,5-diphenylpyrazolium p-toluenesulfonate.

4. The cocmpound: 1,2-dimethyl-3-(m-methylphenyl)-5-phenylpyrazolium methyl sulfate.

5. The compound: 1,2-dimethyl-3-(m-chlorophenyl)-5-phenylpyrazolium methyl sulfate.

6. The compound: 1,2-dimethyl-3-(o-methylphenyl)-5-phenylpyrazolium methyl sulfate.

7. The compound: 1,2-dimethyl-3-(p-chlorophenyl)-5-phenylpyrazolium methyl sulfate.

* * * * *